(12) United States Patent
Herbst et al.

(10) Patent No.: US 7,266,520 B1
(45) Date of Patent: Sep. 4, 2007

(54) DIGITAL COMPUTER SYSTEM AND METHODS FOR MANAGING AN AUCTION MARKET FOR PREFERRED-RETURN SECURITIES

(75) Inventors: Anthony F. Herbst, El Paso, TX (US); Wayne F. Perg, Phoenix, AZ (US)

(73) Assignee: New Market Solutions, LLC, Amado, AZ (US)

( * ) Notice: Subject to any disclaimer, the term of this patent is extended or adjusted under 35 U.S.C. 154(b) by 0 days.

(21) Appl. No.: 09/197,908

(22) Filed: Nov. 23, 1998

(51) Int. Cl.
*G06Q 40/00* (2006.01)

(52) U.S. Cl. .................. 705/35; 705/30; 705/36 R; 705/37; 705/44

(58) Field of Classification Search .............. 705/1, 705/35, 37, 38, 36 R, 44; 395/237
See application file for complete search history.

(56) References Cited

U.S. PATENT DOCUMENTS

| | | | | |
|---|---|---|---|---|
| 4,674,044 A | * | 6/1987 | Kalmus et al. | 364/408 |
| 4,823,265 A | * | 4/1989 | Nelson | 364/408 |
| 5,689,652 A | * | 11/1997 | Lupien et al. | 395/237 |
| 5,809,483 A | * | 9/1998 | Broka | 705/37 |

(Continued)

OTHER PUBLICATIONS

Stock Index Futures Contracts and Separability of Returns, Anthony F. Herbst, Nicholas O. Ordway; The Journal of Futures Markets, vol. 4 No. 1, 87-102, 1984.*

(Continued)

*Primary Examiner*—Vincent Millin
*Assistant Examiner*—Stefanos Karmis

(74) *Attorney, Agent, or Firm*—Peter K. Trzyna, Esq.

(57) ABSTRACT

A digital computer machine and a data processing system, methods involving the same and products produced thereby, as well as data structures and articles of manufacture pertaining thereto, as pertains to an auction for trading preferred return securities. The method includes providing a first digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation and programming the processor to control the apparatus to receive the input data and to produce the output data by steps including: respectively entering financial characteristics of preferred-return instruments representing investments; respectively entering amounts that buyers want to buy of a member from a first group, the first group consisting of at least one of the instruments and at least one group of the instruments, at the respective buyer's hypothetical current preferred return; respectively entering amounts that sellers want to sell of a member of a second group, the second group consisting of at least one of the instruments and at least one group of the instruments, at the respective seller's hypothetical current preferred return; computing a demand schedule for each of said instruments corresponding to the first group; computing a supply schedule for each of said instruments corresponding to the second group; comparing the schedules to produce a current preferred return for each of the corresponding instruments in both the first group and the second group; computing a price for each said instrument having a current preferred return; and generating output representing respective amounts of the instruments respectively in association with at least one member of a group consisting of the current preferred return and the price.

17 Claims, 11 Drawing Sheets

U.S. PATENT DOCUMENTS 5,870,720 A * 2/1999 Chusid et al. ................ 705/38
5,875,437 A * 2/1999 Atkins ......................... 705/40
5,915,209 A * 6/1999 Lawrence ................. 455/31.2
6,029,146 A * 2/2000 Hawkins ...................... 705/35
6,035,289 A * 3/2000 Chou et al. .................. 705/37
6,058,379 A * 5/2000 Odom et al. ................. 705/37

OTHER PUBLICATIONS

Investigation of a Lead-Lag Relationship between Spot Stock Indices and Their Futures Contracts,; Anthony F. Herbst, Joseph P. McCormack, Elizabeth N. West; The Journal of Futures Markets, vol. 7, No. 4, 373-381, 1987.*

* cited by examiner

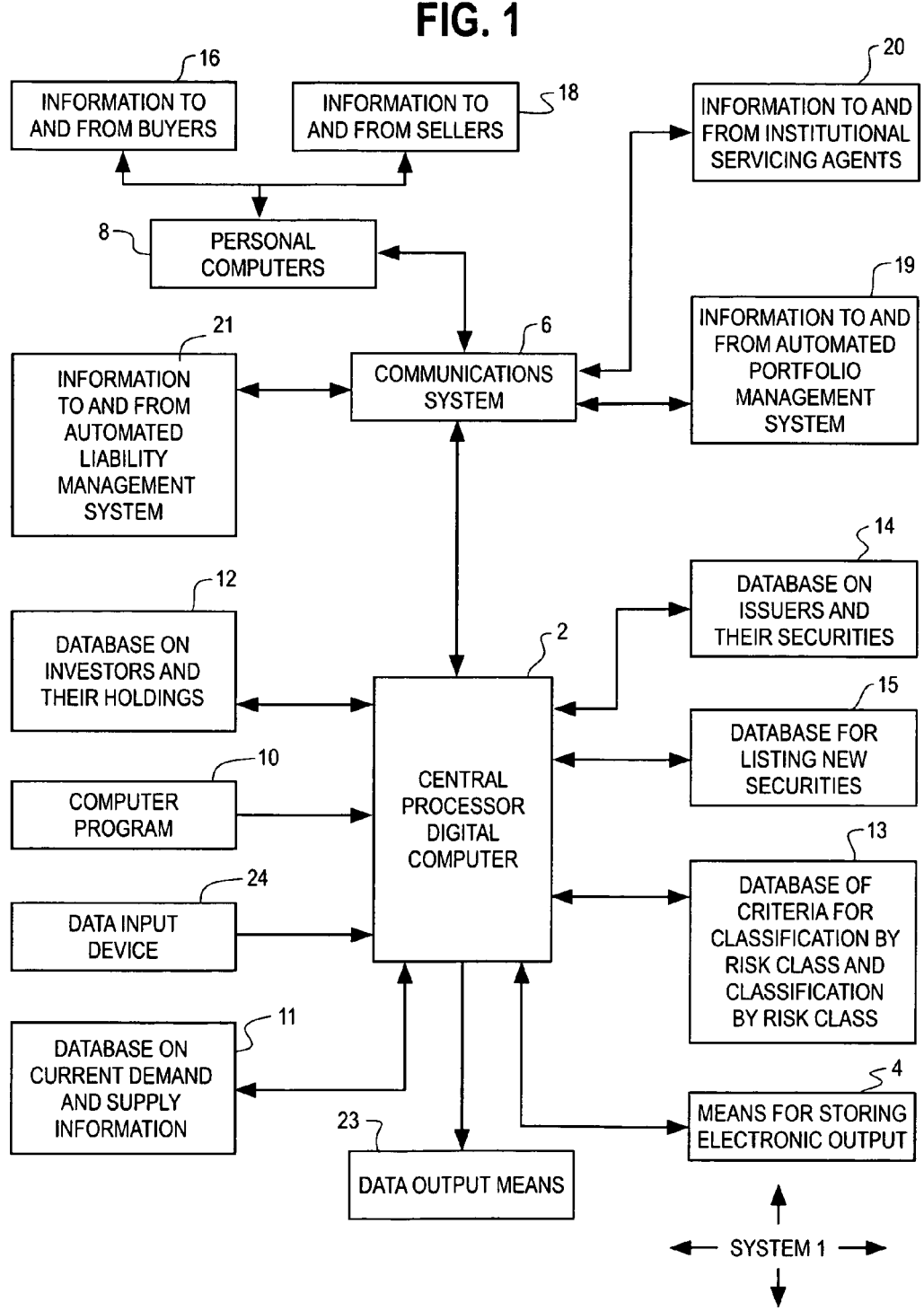

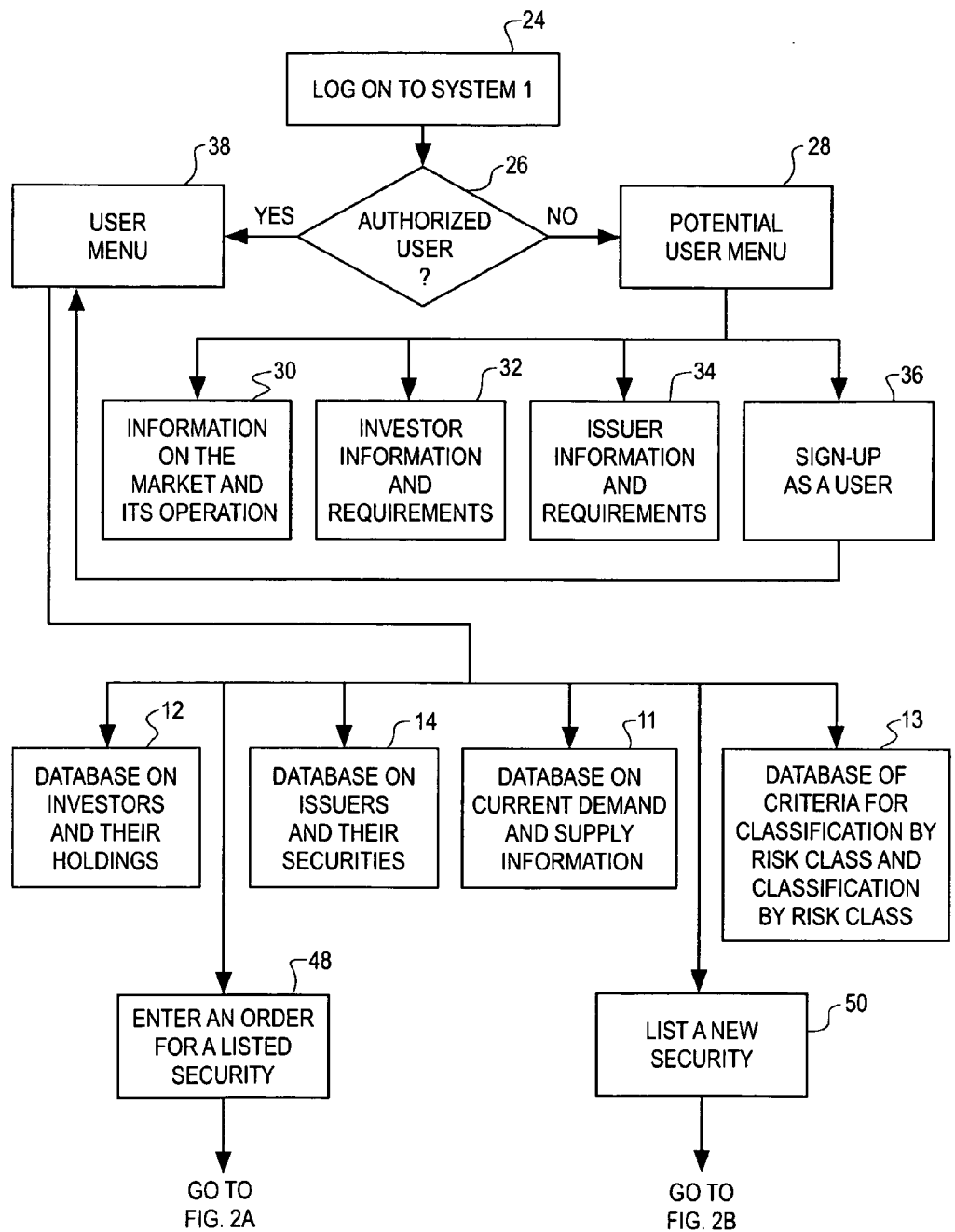

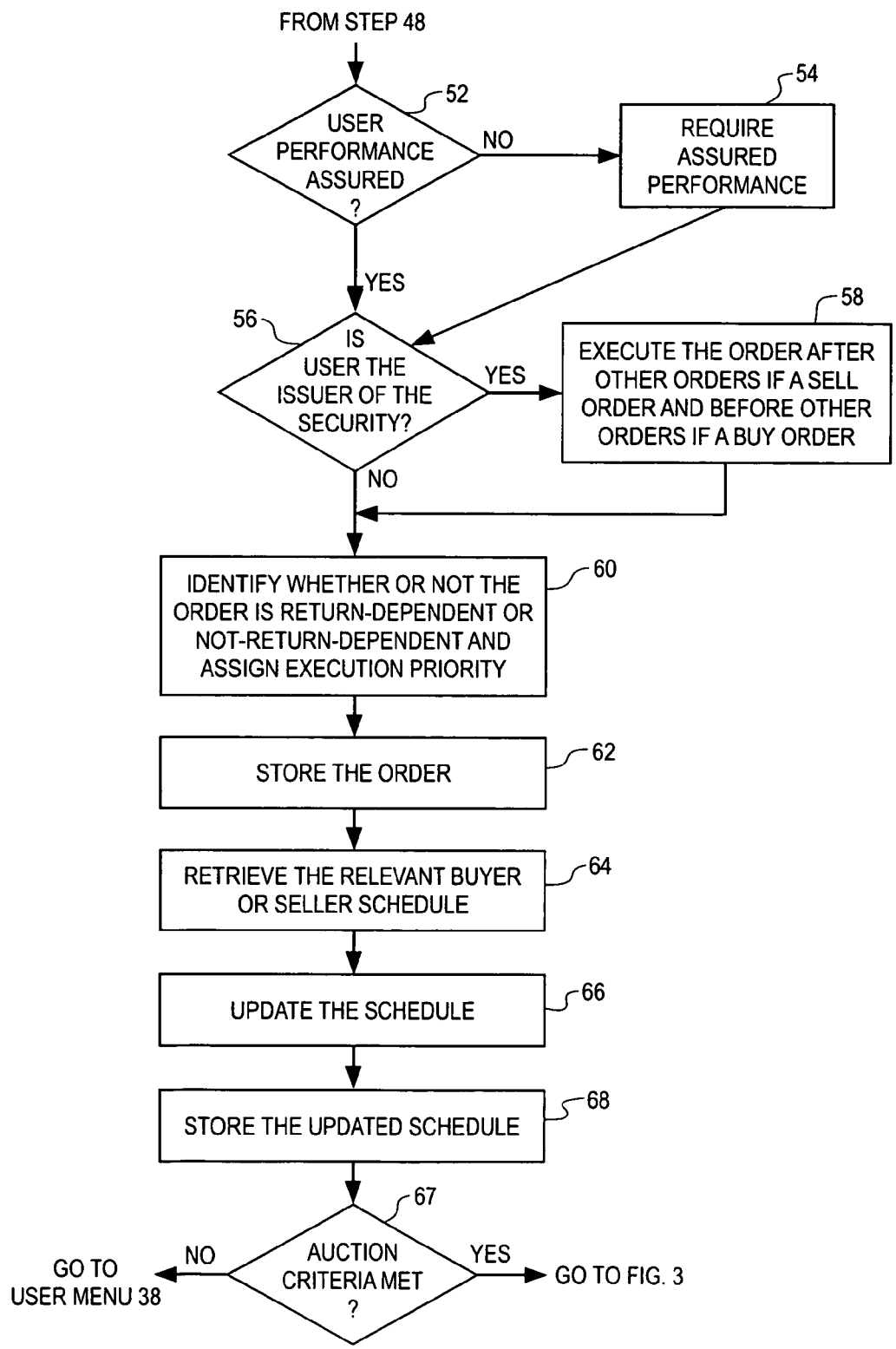

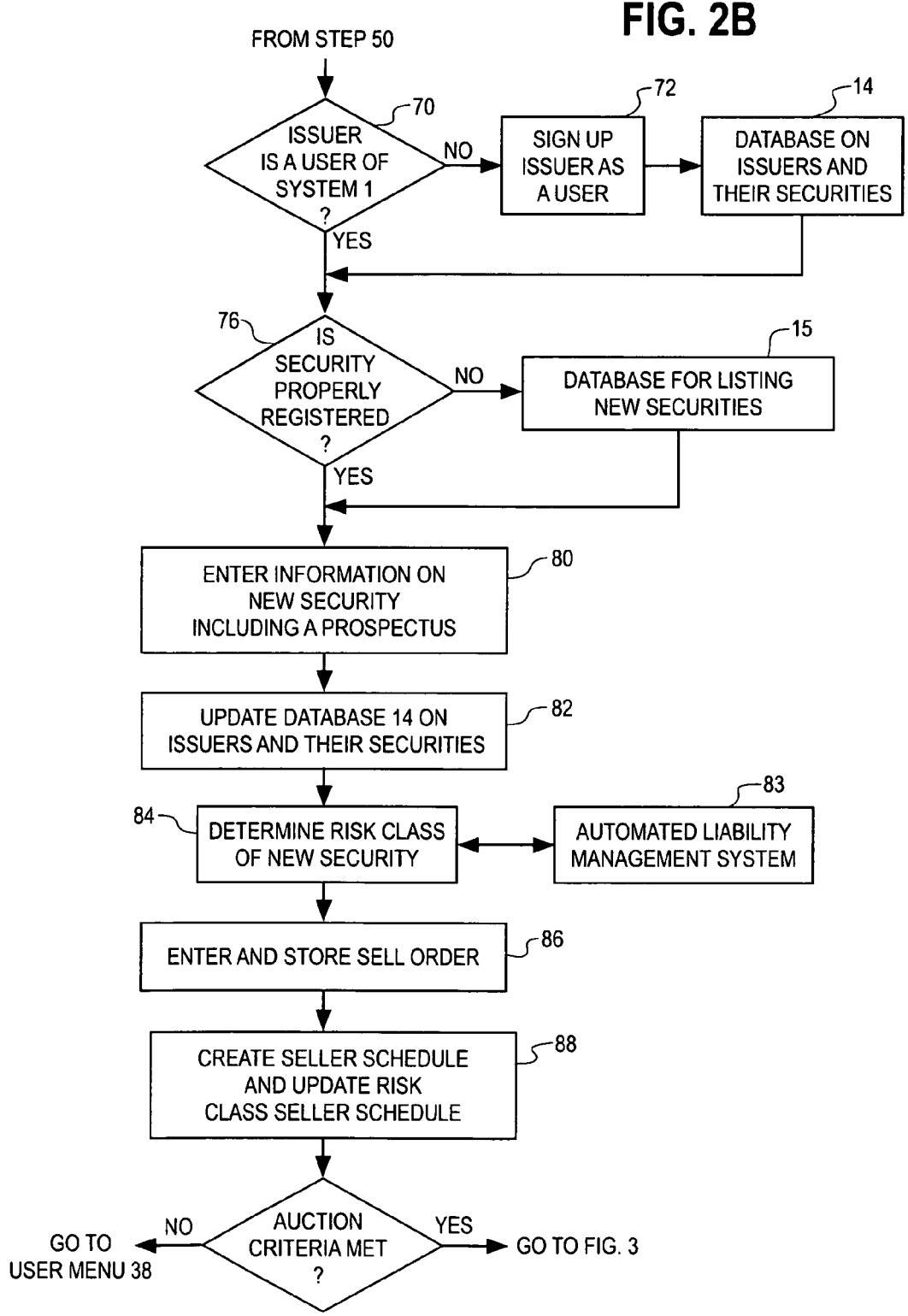

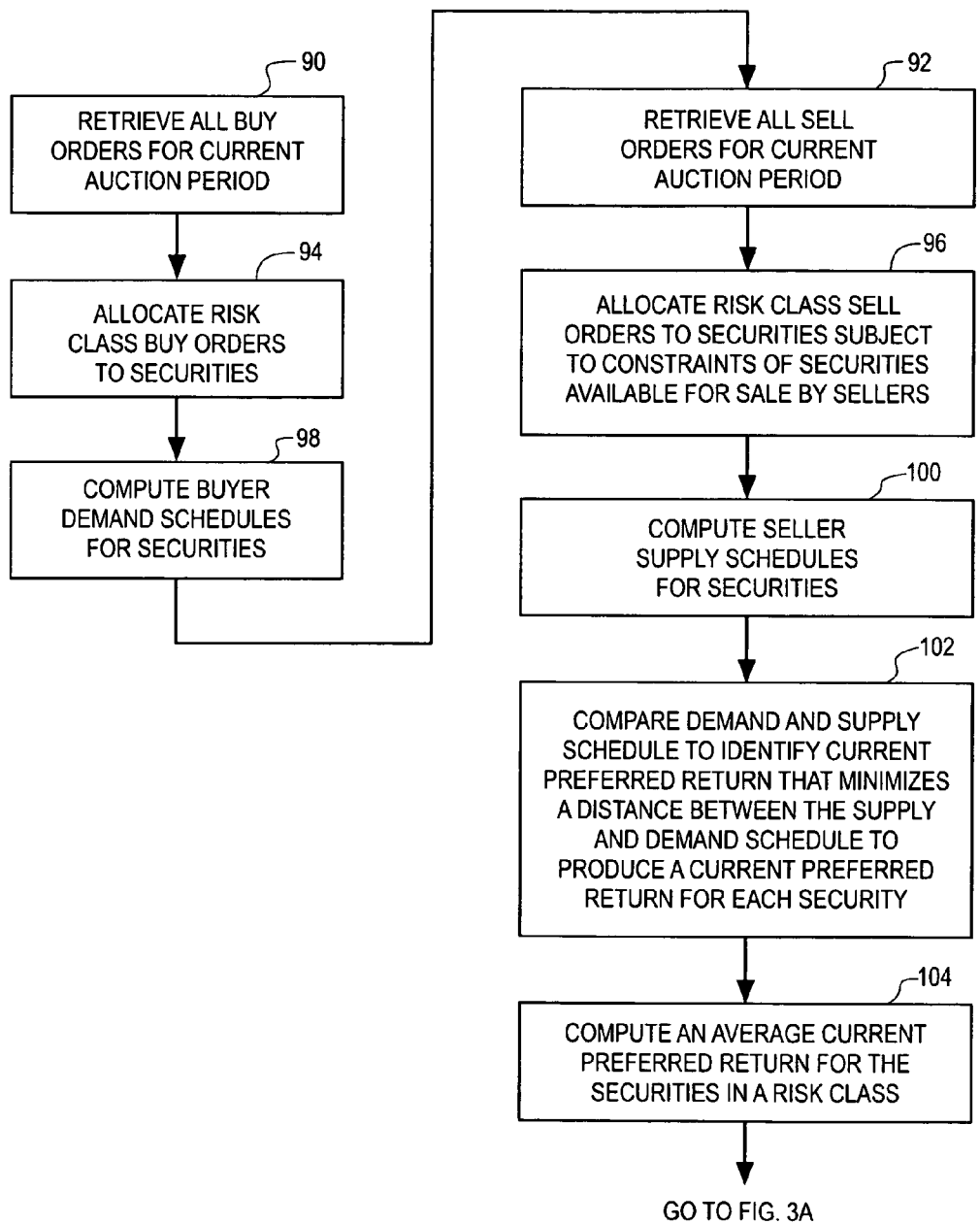

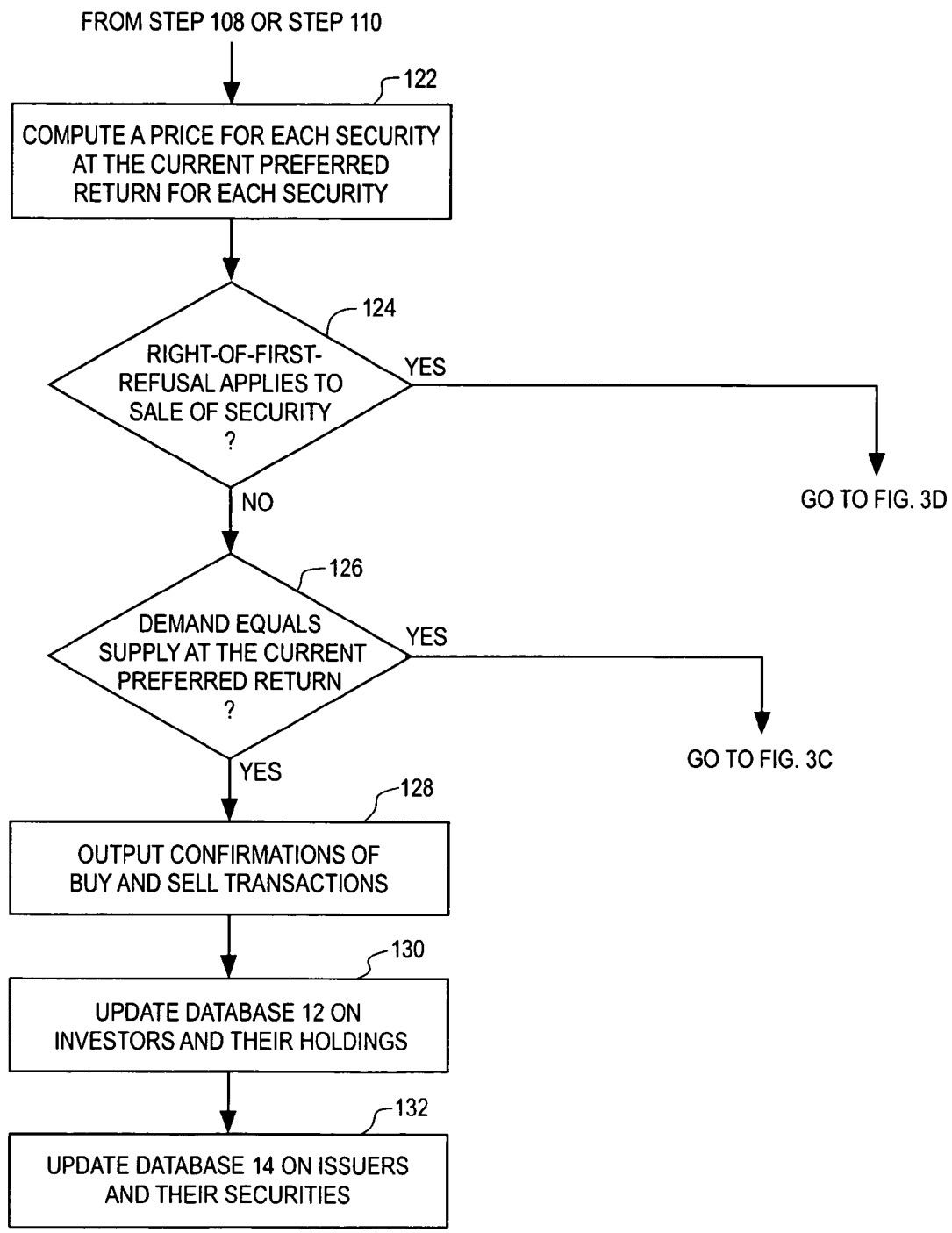

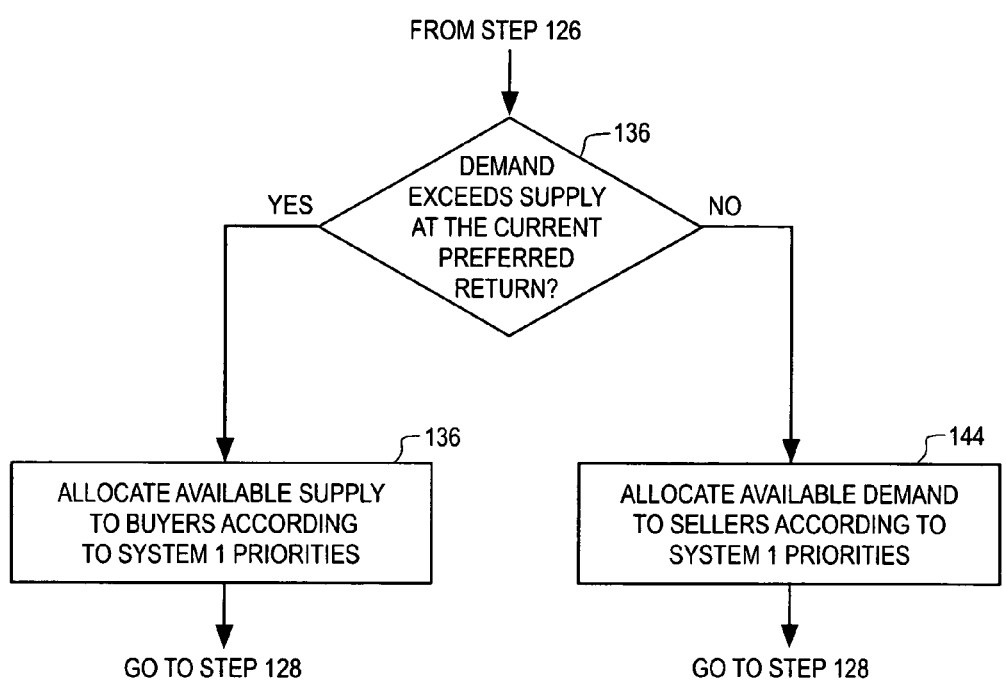

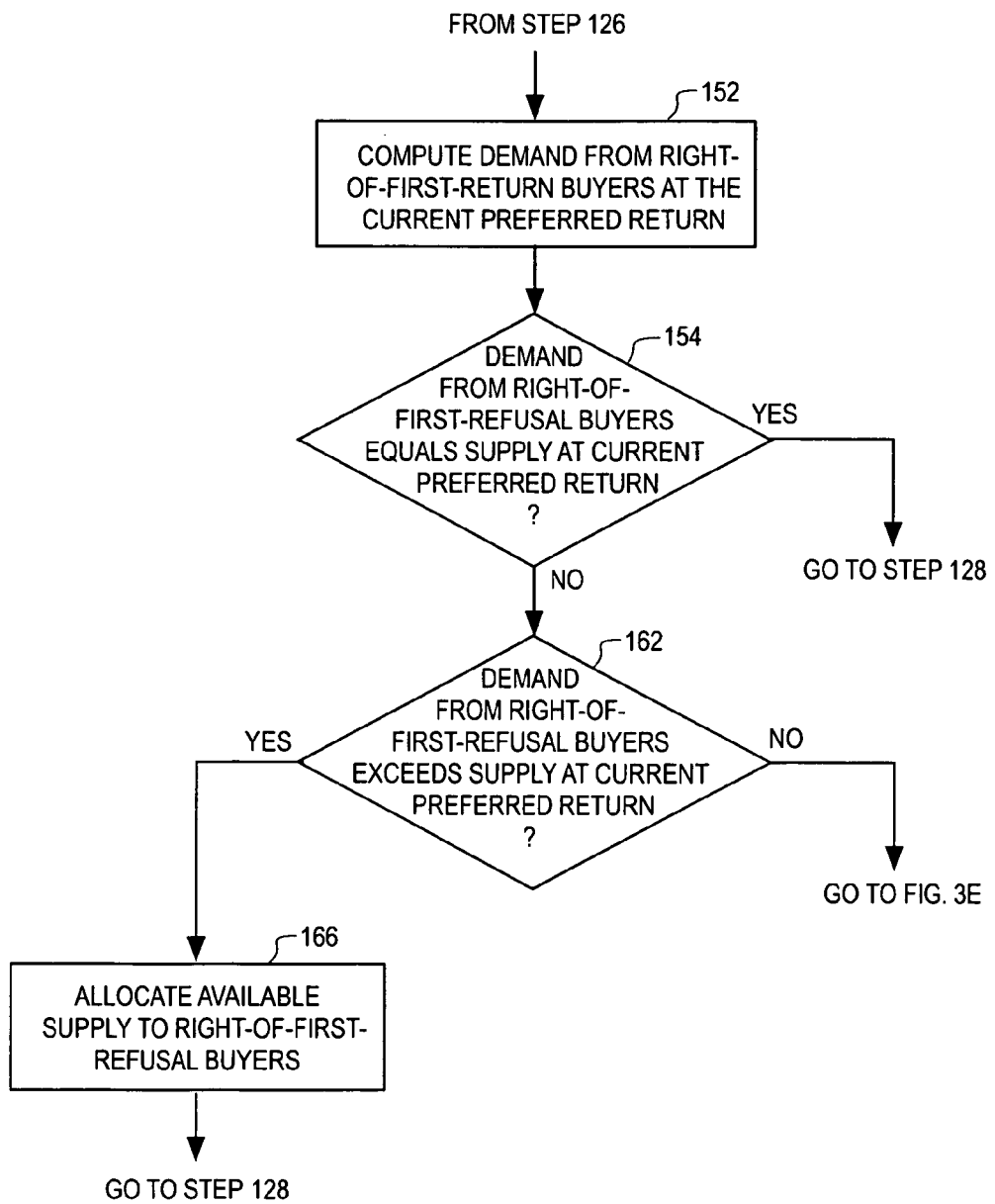

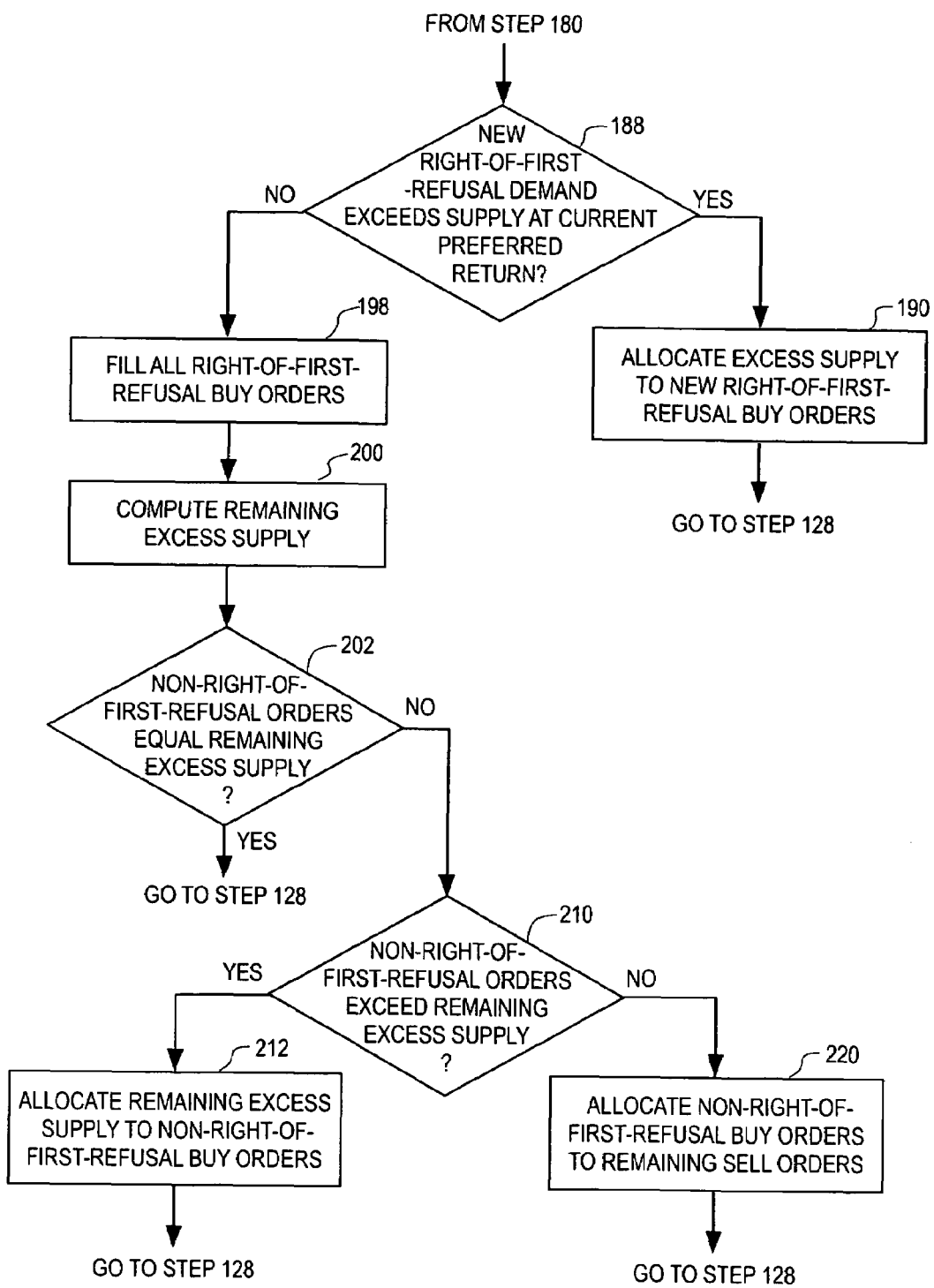

DIGITAL COMPUTER SYSTEM AND METHODS FOR MANAGING AN AUCTION MARKET FOR PREFERRED-RETURN SECURITIES

I. FIELD OF THE INVENTION

The present invention pertains to an electrical digital computer machine and a data processing system, methods involving the same and products produced thereby, as well as data structures and articles of manufacture pertaining thereto, pertaining to computerized aspects of financial fields of securities exchanges, exchange trading, and financial markets. More particularly, this invention relates to a digital electrical data processing system for transforming and improving the market trading of preferred-return securities by managing an automated auction market for preferred-return securities that more efficiently meets needs of both users and providers of funds.

Even more particularly, this invention finds utility extending at least to the following: (1) trading, matching, or bidding; (2) credit(risk) processing and credit transactions; (3) associated document generating; and further to (4) point of sale terminal activity, and (5) having security or user identification provision (password entry, etc.); as well as (6) price determination; (7) interconnecting terminals; (8) inventory monitoring; (9) electronic shopping; (10) inventory management; (11) accounting,(12) such as bill or statement preparation.

An increase in efficiency is such that many users and suppliers of funds who are not able to directly participate in the present markets for preferred-return securities, or can only do so at highly inefficient prices, will find it economical and advantageous to directly participate in this new auction market.

II. BACKGROUND OF THE INVENTION

The present markets for preferred-return securities are divided into primary markets—the markets for the sale of newly-issued securities—and secondary markets—the markets for the resale of existing securities. The secondary markets are almost exclusively dealer markets in which dealers hold inventories of securities in order to make markets in those securities. The dealers offer to buy and sell securities at prices which may be changed without notice at any time. The dealers and participants in the market may use computer systems to support communications and their operations, but market itself is not managed by a data processing system.

The costs per transaction of operating a dealer market are such that dealers tend to offer a smaller spread (the difference between the asking price and the selling price quoted by the dealer) for larger transactions (multi-million dollar orders can command a tight spread). Investors must hold a variety of different securities in order to achieve a relatively safe degree of diversification. Thus, a tendency toward large transaction sizes induces all but the largest investors (funds providers) to refrain from direct participation in present markets for preferred-return securities.

Because present markets for preferred-return securities practically exclude all but the largest investors from direct participation in the market, most investors can economically invest in preferred-return securities only through the services provided by a large financial institution such as a mutual fund company or an insurance company. However, the management fees and other costs charged by these large institutional money managers generally consume a significant proportion of the return received by the investors—a significant problem for the investors.

Presently, vital market information for preferred-return securities is not available to all of the investors. The present markets do not provide data on certain current trades (e.g., price or volume)or data on current bid-ask prices from competing market makers. As a result of this lack of data, even large, sophisticated investors may suffer from high costs for transactions as a result of making trades at prices other than the best currently available price. (It is in the interest of the dealers to withhold information from investors because the information advantage possessed by the dealers enables the dealers to profit at the expense of the investors.)

The Securities and Exchange Commission (SEC) is currently attempting to reduce some of the current inequities of the present secondary markets relative to investors by requiring dealers to report at least some portion of actual transactions including amounts and prices. However, this change will not level the playing field for market participants because dealers will still maintain a large information advantage over investors.

Although the primary markets for the great majority of preferred-return securities are negotiated markets, the primary markets for a few preferred-return securities are operated as auction markets. However, with the exception of the primary market for U.S. Government securities, participation in these auctions tends to be limited to dealers in the secondary markets. Even in the primary market for U.S. Government securities, participation of investors who are not dealers is limited to non-competitive bids—i.e., these investors must commit to purchase a stated amount of new securities at whatever price and return is determined by the auction. Present auction primary markets are limited to relatively large transactions because participation is largely restricted to dealers and dealers must purchase securities in quantity in order to operate efficiently.

In negotiated primary markets the funds user negotiates the terms of the securities offering with an investment banker. The investment banker may guarantee the terms of the offering or may only attempt to place the issue on a best efforts basis.

The transactions costs in negotiated primary markets are sufficiently high that only large transactions are economical. Because the present primary markets for preferred-return securities (both auction and negotiated markets) are suitable only for rather large transactions, most funds users are shut out of the market for long-term capital because they are too small to be able to issue preferred return securities.

Therefore, the background of the present invention reflects many problems, both on the issuer and investor side. No resolution of the problems has been forthcoming, leaving funds users unable to access long term capital and investors unable to optimize their investment portfolios.

III. SUMMARY OF THE INVENTION

In view of the foregoing, it is an object of the present invention to provide a digital computer machine and a data processing system, methods involving the same and products produced thereby, as well as data structures and articles of manufacture pertaining thereto for improving over the foregoing problems encountered in the prior art.

It is another object of the present invention to provide a digital computer machine and a data processing system, methods involving the same and products produced thereby, as well as data structures and articles of manufacture pertaining thereto such that the digital electrical apparatus to electrically process signals in generating output in accordance with a computer program embodied in all or in part in hardware or software.

It is yet a further object of the present invention to provide a first digital electrical computer apparatus for comparing (by computer means) demand and supply to produce a current preferred return for instruments, and computing a price for an amount of the instrument It is yet an additional object of the present invention to generate, by computer means, output representing respective amounts of the instruments respectively in association with at least one member of a group consisting of the current preferred return and the price.

It is still an additional object of the present invention to provide computerized means for respectively entering seller's information including holdings prior to a sale of the investment; and generating further output representing respective sellers' holdings seller adjusted for the sale of the investment.

It is still another object of the present invention to provide computerized means for (alternatively or in any combination) entering financial characteristics includes entering a preferred return for the instrument, entering a face value for the instrument, entering a payment schedule for the instrument, entering a right of first refusal and/or entering an amortization schedule return for the instrument as one of the financial characteristics.

It is still another object of the present invention to provide computerized means for computing any imbalance between each said supply schedule and each said demand schedule at the current preferred return for the investment; and allocating the respective imbalances among the buyers for each excess in each said demand schedule and allocating the respective imbalances among the sellers for each excess in each said supply schedule.

It is yet still another object of the present invention to provide computerized means for entering amounts that the sellers want to sell includes entering information identifying some of the sellers as issuers of respective ones of the instruments; and the step of allocating includes giving priority to the ones of the instruments.

It is moreover another object of the present invention to provide computerized means for signal processing such that at least one of the step of entering the amounts that the buyers want to buy and the step of entering the amounts that the sellers want to sell includes optionally entering respective standing orders.

It is additionally still another object of the present invention to provide computerized means for signal processing such that at least one of the step of entering the amounts that the buyers want to buy and the step of entering the amounts that the sellers want to sell includes optionally entering a respective time associated with the amounts for a sale to be completed.

It is additionally still another object of the present invention to provide computerized means for signal processing such that the steps of comparing the schedules, computing a price, and generating output are carried out whenever a criteria from a group consisting of at least a time period and an order quantity is satisfied.

It is even more an object of the present invention to provide computerized means for signal processing to provide an alternate embodiment in which the steps of comparing the schedules, computing a price, and generating output are triggered by the step of entering amounts that buyers want to by and the step of entering amounts that sellers want to sell.

It is even moreover an object of the present invention to provide computerized means for signal processing to support entering amounts that buyers want to buy of the instruments or the instruments defined by a common risk class.

Furthermore, it is even moreover an object of the present invention to provide computerized means for signal processing involving remote computing activities using a second digital electrical computer apparatus handling data obtained from or generated by the first digital computer apparatus.

The inventors herein have sought to attain these and other objects evident herein as making matters better by providing a modern, networked automated data processing systems that for the first time makes it possible to create automated auction primary and secondary markets for preferred-return securities that facilitate the direct participation of the majority of funds users and funds suppliers.

An automated auction primary market can efficiently handle small issues, thus opening the capital markets to the majority of business firms, provided that the market is open to the direct participation of the majority of investors. However, the majority of investors will find direct participation in the auction primary market to be safe only if they have direct access to an efficient secondary market for the securities. Therefore, opening the capital markets to the majority of business firms requires both an automated auction primary market and an automated auction secondary market.

Generally, to meet these and the other objects of the present invention apparent from improving over the prior state of affairs, we have invented provided with a computer system and methods for managing an auction market for preferred-return securities. The data processing system includes a programmed electrical digital computer having a processor electrically connected to an input device and to an output device. The data processing system receives buy orders from buyers and sell orders from sellers, computes buyer and seller schedules, compares the schedules, determines a current preferred return, calculates the price of the security at the current preferred return, and generates output regarding amounts, returns and prices.

More particularly, based upon our discovery of system requirements that must be satisfied in order to facilitate the direct participation of the majority of funds users and funds suppliers, an automated data processing system is provided to manage automated auction markets for preferred-return securities. The use of an automated auction market structure for both the primary and secondary markets is an approach that is particularly preferred. In such an automated auction market, the cost per transaction can be reduced to the point that even very small transactions are economical for both buyers and sellers. Therefore, the automated auction market system of the present invention can facilitate the direct participation of the majority of funds users and suppliers by reducing transactions costs to economical levels for the small transactions required by the majority of funds users and suppliers.

In contrast, structures other than automated auction markets require the services of highly-skilled and highly-compensated people to be employed in every transaction, resulting in a high minimum cost per transaction. This high cost per transaction makes small transactions uneconomical for both buyers and sellers, thus making it uneconomical for the majority of funds users and funds suppliers to directly participate in the market.

Both the primary and the secondary markets are best structured as automated auction markets, if the markets are to facilitate the direct participation of the majority of funds users and suppliers. That is, if the primary market is not structured as an automated auction market, access to the capital markets is limited to large funds users and only large funds suppliers are able to directly purchase new preferred-return securities. And if the secondary market is not an automated auction market, secondary markets are made only for large issues of securities and only large suppliers of funds will have access to the secondary market. The resultant difficulties in reselling securities will make raise the returns on small issues of preferred-return securities to uneconomical levels and create a level of risk that will exclude most small providers of funds from the direct purchase of preferred-return securities.

The primary and secondary markets may be structured as either separate automated auction markets or as one integrated primary and secondary automated auction market. The present invention allows for both structures, but an integrated primary and secondary market is described as the preferred embodiment of the invention because auction markets function most efficiently if all buyers and sellers are gathered together in one auction.

In addition to reduced costs per transaction, an automated auction secondary market tends to stabilize the prices of securities by increasing the market power of long-term investors and reducing the market power of short-term traders. The trades of long-term investors tend to stabilize prices because long-term investors usually trade on the basis of divergence of price from the inherent value of the security as measured by the present value of expected future cash flows, thus creating negative feedback that pushes price back toward inherent value. The trades of short-term traders tend to make prices more volatile because short-term traders usually trade of the expectation the prices will continue to rise or fall as the case may be, thus reinforcing price trends without reference to inherent value and increasing price volatility.

The market power of long-term investors is increased because the automated auction market greatly increases the number of long-term investors who are able to directly participate in the market. The market power of short-term traders is reduced because the time gaps between auctions make short-term trading inherently more risky and less profitable, thus discouraging short-term trading.

The largest factors creating price volatility in most preferred-return securities are inflation risk and interest rate risk. To a large degree, interest rate risk reflects inflation risk because the largest part of interest rate variability is caused by changes in the expected future rate of inflation. All of the inflation risk and most of the interest rate risk can be eliminated by fixing the promised future cash flows and rate of return in units of constant purchasing power instead of in monetary units whose purchasing power declines with inflation. Because of their significantly reduced price variability, these constant-currency instruments (see, U.S. Pat. No. 5,237,500, incorporated by reference) will work especially well with these new automated auction markets.

Even more particularly, in responding to the foregoing needs and objects, we have invented machine and a data processing system, methods involving the same and products produced thereby, as well as data structures and articles of manufacture pertaining thereto, including providing a first digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation and programming the processor (i.e., making circuitry therein—which of course is how a program transforms a general purpose computer into a new machine) to control the apparatus to receive the input data and to produce the output data by steps including: respectively entering financial characteristics of preferred-return instruments representing investments; respectively entering amounts that buyers want to buy of a member from a first group, the first group consisting of at least one of the instruments and at least one group of the instruments, at the respective buyer's hypothetical current preferred return; respectively entering amounts that sellers want to sell of a member of a second group, the second group consisting of at least one of the instruments and at least one group of the instruments, at the respective seller's hypothetical current preferred return; computing a demand schedule for each of said instruments corresponding to the first group; computing a supply schedule for each of said instruments corresponding to the second group; comparing the schedules to produce a current preferred return for each of the corresponding instruments in both the first group and the second group; computing a price for each said instrument having a current preferred return; and generating output representing respective amounts of the instruments respectively in association with at least one member of a group consisting of the current preferred return and the price.

We have also developed our invention such that it includes providing for respectively entering seller's information including holdings prior to a sale of the investment; and generating further output representing respective sellers' holdings seller adjusted for the sale of the investment.

We have additionally developed our invention such that the step of entering financial characteristics includes entering a preferred return for the instrument, entering a face value for the instrument, entering a payment schedule for the instrument, entering a right of first refusal and/or entering an amortization schedule return for the instrument as one of the financial characteristics (i.e., and any combination thereof.

We have further developed our invention to include computing any imbalance between each said supply schedule and each said demand schedule at the current preferred return for the investment; and allocating the respective imbalances among the buyers for each excess in each said demand schedule and allocating the respective imbalances among the sellers for each excess in each said supply schedule.

In such an embodiment, the invention can be carried out such that the step of entering amounts that the sellers want to sell includes entering information identifying some of the sellers as issuers of respective ones of the instruments; and the step of allocating includes giving priority to the ones of the instruments.

We have still further developed our invention such that at least one of the step of entering the amounts that the buyers want to buy and the step of entering the amounts that the sellers want to sell includes optionally entering respective standing orders.

We have yet further developed our invention such that at least one of the step of entering the amounts that the buyers want to buy and the step of entering the amounts that the sellers want to sell includes optionally entering a respective time associated with the amounts for a sale to be completed.

We have moreover developed our invention such that the steps of comparing the schedules, computing a price, and generating output are carried out whenever a criteria from a group consisting of at least a time period and an order quantity is satisfied. However, an alternate embodiment is one in which the steps of comparing the schedules, computing a price, and generating output are triggered by the step of entering amounts that buyers want to by and the step of entering amounts that sellers want to sell.

Furthermore, we have developed our invention such that in any case, the step of entering financial characteristics includes entering a risk class for the respective instruments; and the step of entering the amounts that the buyers want to buy includes entering amounts that buyers want to buy of a member from a first group, the first group consisting of at least one of the instruments and at least one group of the instruments defined by a common risk class; and the step of entering the amounts that the sellers want to sell includes entering amounts that sellers want to sell of a member from a second group, the second group consisting of at least one of the instruments and at least one group of the instruments defined by a common risk class.

Even more, we have developed our invention such that remote computing activities, for example, providing a second digital electrical computer apparatus including a second digital computer having a second processor, the second processor electrically connected to a second memory device for storing and retrieving second machine-readable signals, to a second input device for receiving second input data and converting the second input data into second input electrical data, and to a second output device for converting second output electrical data into second output having a second visual presentation and programming the second processor to control the apparatus to receive the second input data and to produce the second output data by steps including: using data obtained from the first digital electrical computer in remotely generating, at said second digital electrical computer apparatus, output representing respective amounts of preferred return instruments respectively in association with at least one member of a group consisting of the current preferred return and the price.

For such remote computing, we also have developed our invention to include using a second digital electrical machine to electrically process data obtained from a first digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation and programming the processor to control the apparatus to receive the input data and to produce the output data, to remotely price a preferred return instrument representing an investment, the method including: providing a second digital electrical computer apparatus including a second digital computer having a second processor, the second processor electrically connected to a second memory device for storing and retrieving second machine-readable signals, to a second input device for receiving second input data and converting the second input data into second input electrical data, and to a second output device for converting second output electrical data into second output having a second visual presentation and programming the second processor to control the apparatus to receive the second input data and to produce the second output data by: obtaining data representing at least one of a group consisting of a price and a preferred rate of return for a member of a group consisting of at least one of the instruments and at least one group of the instruments, the data having been produced at the first digital electrical computer; and utilizing said data in generating, at said second digital electrical computer remote from said first digital electrical computer, second output representing respective amounts of preferred-return instruments respectively in association with at least one member of a group consisting of the current preferred return and the price.

Though the foregoing discussion has been particularly characterized with reference to the method using the present invention, the corresponding apparatus (i.e., machine), method for making the invention, article of manufacture (e.g., computer program and data on a storage medium), data structures, and necessary intermediates and products produced by the invention are included as well.

In sum, by application of the invention that we have developed, capital markets can more efficiently allocate capital and increase the net (after financial market expenses) return to investors, thus reducing the cost of capital, preferably by facilitating real-time trading of preferred-return instruments by computerizing the auction activity. The functioning of our invention will also increase the inherent stability of the markets for preferred-return securities, thus reducing risk and further decreasing the cost of capital. There result is higher and more stable economic growth and increased wealth for both providers and users of funds.

IV. BRIEF DESCRIPTION OF THE DRAWINGS

FIG. 1 is an illustration of an embodiment of the present invention;

FIG. 2 is an illustration of a flow chart for an embodiment of the present invention;

FIG. 2A is an illustration of a flow chart for an embodiment of the present invention;

FIG. 2B is an illustration of a flow chart for an embodiment of the present invention;

FIG. 3 is an illustration of a flow chart for an embodiment of the present invention;

FIG. 3B is an illustration of a flow chart for an embodiment of the present invention;

FIG. 3C is an illustration of a flow chart for an embodiment of the present invention;

FIG. 3D is an illustration of a flow chart for an embodiment of the present invention;

FIG. 3F is an illustration of a flow chart for an embodiment of the present invention;

V. DETAILED DESCRIPTION OF A PREFERRED EMBODIMENT

Figure 3A:
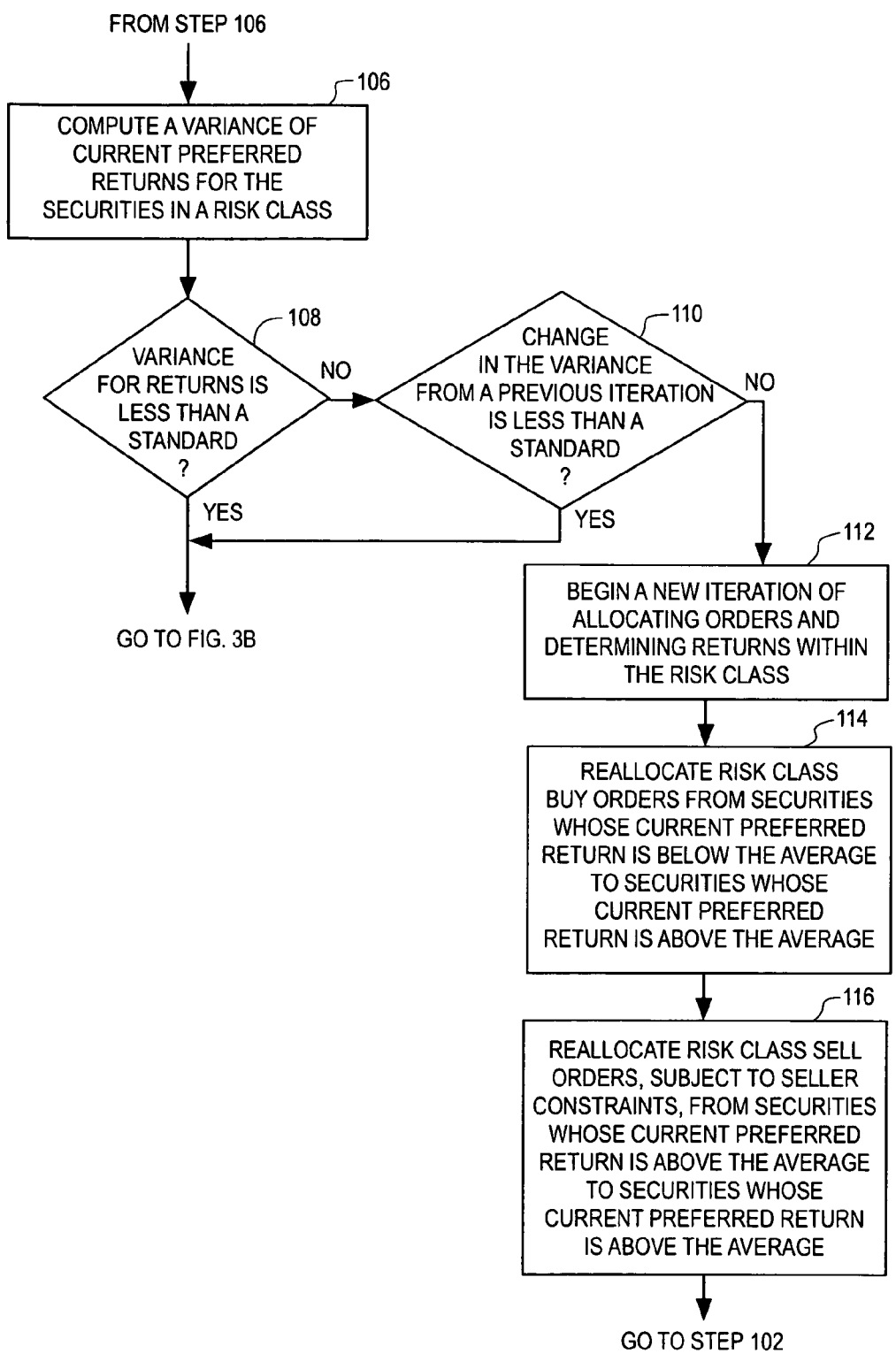
FIG. 3A is an illustration of a flow chart for an embodiment of the present invention.

The inventors have provided the present invention to facilitate lowering costs to investors and providing access to capital markets for more firms. The invention is based on our discovery of the problems of the present state of affairs and evolved from our determining system requirements that must be satisfied to solve these problems, which in turn permitted us to design an automated data processing system that forms the illustrative embodiment of the invention discussed herein.

Referring now to FIG. 1, an the embodiment of the present invention is illustrated so as to indicate how to make and how to use the automated auction market system 1 for preferred return securities. At the heart of the invention is at least one digital electrical computer 2, such as a server in a distributed network. The digital electrical computer 2 has a memory device for storing electronic output 4, such as a hard drive, diskette and disk drive, etc. The digital electrical computer 2 is connected to a communications system 6, such as the Internet, by such means as a modem. Terminals 8, such as PCs or dumb terminals can link to the communications system 6 to communicate with the digital electrical computer 2. Additionally, the digital electrical computer 2 is connected to a data input device 22, such as a keyboard, and data output device 23, such as a printer and/or monitor. The digital electrical computer 2 is controlled by a computer program 10.

Note that the computer program 10 is preferably in software, but can alternatively be wholly or partially in hardware. A software approach, e.g., the program stored on a diskette article of manufacture, provides a useful facility for inputting or storing data structures that are a product produced by the computer program 10, as well as for inputting a software embodiment of the present invention. Of course, storing the computer program 10 in a software medium is optional because the same result can be obtained by replacing the computer program 10 in a software medium with the computer program 10 in a hardware storage device, e.g., by burning the computer program 10 into a ROM, using conventional techniques to convert software into an ASIC or FPGA, etc., as would be readily understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771-786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353-367, both of which are incorporated by reference.) In this regard, it should also be noted that "input" can include inputting data for processing by the computer program 10 or inputting in the computer program 10 code itself. The software embodiment is preferable for flexibility, but these approaches are equivalent.

The computer program 10 facilitates accessing as well as using database 12 of data identifying investors and their securities holdings, database 14 of data pertaining to issuers of securities and their securities, database 11 of current demand and supply information, preferably by security and risk class, database 13 of criteria for classification by risk class and classification by risk class, and database 15 of data for use in listing a new security.

The computer program 10 facilitates accessing as well as using information 16 received from and provided to buyers of securities, information 18 received from and provided to sellers of securities, information 19 received from and provided to automated portfolio management systems, information 20 received from and provided to institutional servicing agents, information 21 received from and provided to automated liability management systems.

A second digital computer 3 with a central processor, memory device 7, input device 5, and output device 9 may be connected to the first digital computer 2. This second digital computer 3 is controlled by a second computer program 27. The second digital computer 3 obtains data 17 from the first digital computer 2.

Referring now to FIG. 2, users of the automated market first log on 24 to the system 1. The system 1 then checks 26 whether or not the user is an authorized user of the automated market. In checking whether or not the user is an authorized user, the system 1 may communicate 20 with institutional servicing agents of the automated market. If the user is not an authorized user, the user is referred to a potential user menu 28. The potential user menu 28 will allow the user to access information 30 regarding how the system 1 works, information 32 on investor requirements, information 34 on issuer requirements, and how sign-up 36 as an authorized user of the automated market. Upon signing up as a user the user enters 37 seller information including securities information and then is referred to a user menu 38.

If the user is an authorized user, the user is referred to a user menu 38. One choice is to access a database 14 of data pertaining to issuers of securities. A second choice is to access a database 12 of data identifying investors and their securities holdings. A third choice is to access a database 11 of current demand and supply information, preferably by security and risk class. A fourth choice is to access a database 13 of criteria for classification by risk class and classification by risk class. A fifth choice is to list a new security 50, which leads to FIG. 2B. A sixth choice is to enter 48 a buy order and buyer information, which leads to FIG. 2A. A seventh choice is to enter 49 a sell order and seller information, which leads to FIG. 2A.

Turning now to FIG. 2A, from step 48, the system 1 determines 52 whether or not buyer performance is assured. Buyer performance may be assured by a third party, such as a broker-dealer or it may be assured directly by funds on deposit. If buyer performance is not assured, the system 1 will require 54 assured performance before proceeding.

If buyer performance is assured in step 52, the system 1 then identifies 56 the time of order entry and determines 58 the group (a group may be one or more) of instruments to which the buy order applies. Next system 1 determines 60 if the buyer is also the issuer, determines 62 an execution priority, and stores 64 the order.

System 1 then retrieves 66 stored buy orders and computes 68 a demand schedule. Next system 1 determines 70 if auction criteria are met. If auction criteria are met, go to FIG. 3, if not, return to user menu 38.

From step 49, system 1 determines 53 if seller performance is assured. Seller performance may be assured by instruments on deposit or other means of guaranteeing seller performance. If seller performance is not assured, system 1 requires 55 assured performance. If seller performance is assured, system 1 identifies 57 the time of the order entry, determines 57 the group of instruments to which the sell order applies, determines 61 if the seller is also the issuer, and stores 65 the sell order.

System 1 then retrieves 67 stored sell orders, computes 69 a supply schedule, and determines 70 if auction criteria are met. If auction criteria are met, go to FIG. 3. If auction criteria are not met, return to step 38. Going to FIG. 2B, from step 50 (listing a new security), system 1 first determines whether or not the issuer of the security is presently a user of the market 73. If not, the issuer must sign up 72 as a user of the market. Upon sign up, system 1 obtains 74 data from the issuer and adds the data to database 14. Next, the system 1 determines 76 whether or not the security is properly registered with the required federal and state authorities. If not, the system 1 will provide access to a database 15 of information and help regarding registration. Preferably, the registration process should be automated and on line, to the extent permitted by regulators.

If the security is properly registered, the next step is entry 80 of instrument characteristics and user information. Then the issuer database is updated 82. The system 1 interacts with an automated liability management system 83, and the risk class of the new security is then confirmed 84. A sell order is entered and stored 86 in database 11.

In step 88, the system 1 creates a seller schedule for the new security and updates the risk class seller schedule 88 in database 13. Next the system 1 determines 70 if auction criteria are met. If not, system 1 returns to the user menu 38. If the auction criteria are met, go to FIG. 3.

Referring now to FIG. 3, the system 1 auction steps begin when the auction criteria have been met. The system 1 retrieves 90 all buy orders for the current auction. The system 1 then allocates 94 all risk class buy orders to the instruments in that risk class. After the allocations, the system 1 computes 98 a new buyer schedule for each instrument. Next, system 1 retrieves 92 all sell orders for the current auction and allocates 96 all risk class sell orders to the instruments in that risk class subject to constraints of instruments available for sale by sellers. System 1 proceeds with computing 100 a new seller schedule for each instrument.

The system 1 then compares 102 demand and supply schedules to produce a current preferred return for each instrument. Then system 1 computes 104 an average current preferred return for the instruments in each risk class.

Figure 3E:
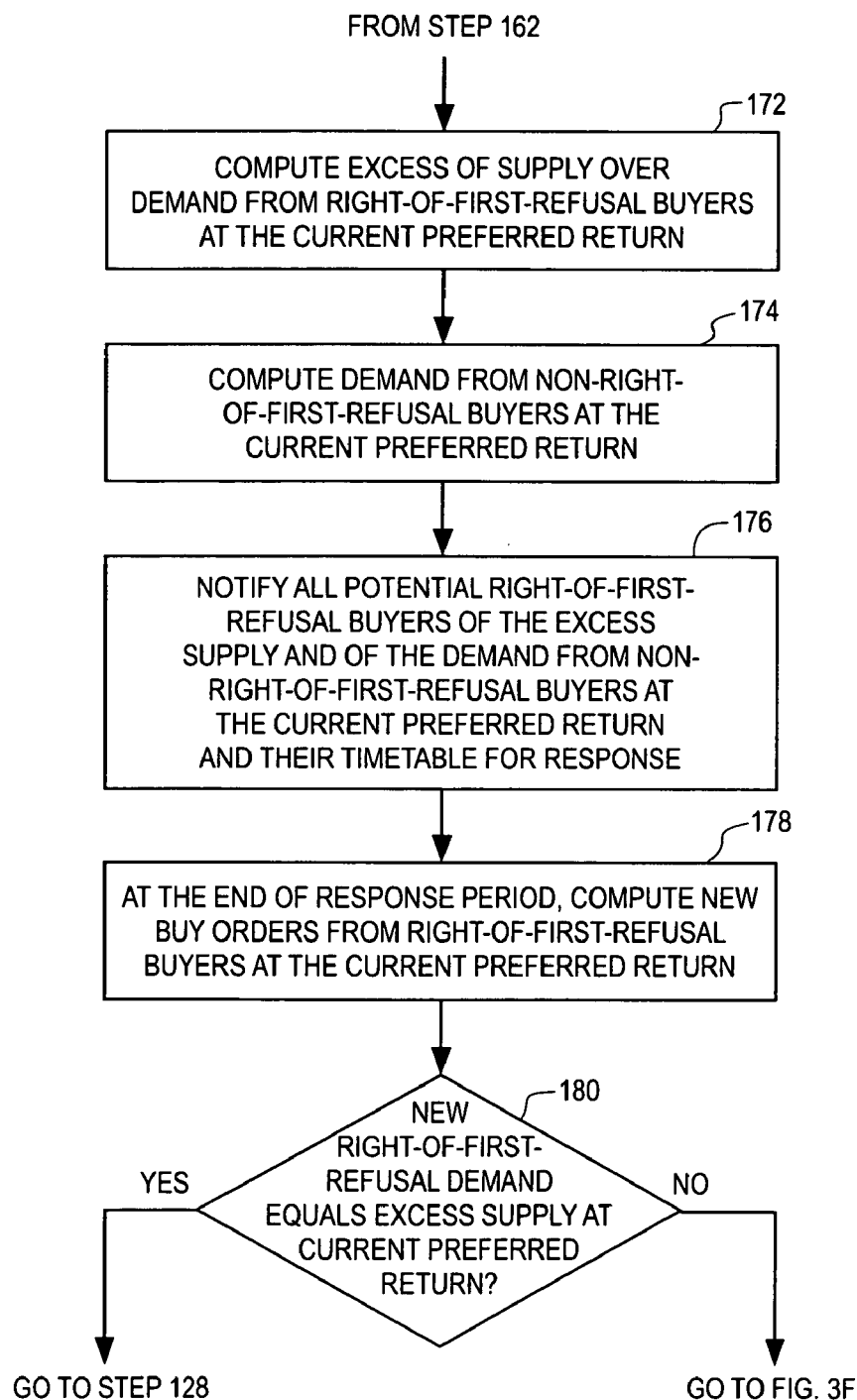
FIG. 3E is an illustration of a flow chart for an embodiment of the present invention.

From step 104, the system 1 goes to FIG. 3A. Following step 104, the system 1 computes 106 a variance of current preferred returns for the instruments in each risk class.

The system 1 then determines 108 whether or not the variance of current preferred returns is less than a standard, e.g., zero or more to limit the variance of the current preferred returns in a risk class. If the variance is not less than the standard, the system 1 then determines 110 whether or not the change in the variance from previous iterations is less than a standard, e.g., if preferences for certain instruments make it impossible to reduce the variance of returns in the risk class to the standard, then the system 1 stops trying to reduce the variance. If either standard is met, system 1 goes to FIG. 3B.

If neither standard is met, the system 1 then begins 112 another iteration of allocating orders and determining returns within risk classes. The system 1 reallocates 114 risk class buy orders from instruments whose current preferred return is below the average for the risk class to instruments whose current preferred return is above the average for the risk class. Similarly, the system 1 reallocates 116 risk class sell orders, subject to seller constraints (e.g., instruments held and/or currently issuing), from instruments whose current preferred return is above the average for the risk class to instruments whose current preferred return is below the average for the risk class.

The reallocation rules may be modified for securities that are on watch for a risk class upgrade or downgrade. However, the integration of the automated market invention with another invention—an automated liability management system 83 for issuers of securities—is expected to reduce the probability and frequency of risk class changes. (See 21 in FIG. 1.)

Upon meeting a standard (steps 108 or 110) and terminating the iterations in FIG. 3A, the system 1 goes to FIG. 3B and computes 122 a price for each instrument at the current preferred return. The system 1 then determines 124 whether or not a right of first refusal applies to the instrument. If yes, then system 1 goes to FIG. 3D. If no, the system 1 then determines 126 whether or not demand equals supply at the current preferred return for the instrument. If no, then the system 1 goes to FIG. 3C. If yes, the system 1 outputs 128 confirmations of buy and sell transactions, outputs 129 sellers' and buyers' holdings adjusted for the buy and sell transactions, updates 130 the database 12 on investors and updates 132 the database 14 on issuers.

If no at step 126, the system 1 goes to FIG. 3C. Next the system 1 computes 134 the imbalance between the supply schedule and the demand schedule, allocates 136 the imbalance according to system priorities, and then outputs confirmations of buy and sell transactions by going to step 128.

In step 124 of FIG. 3B, if the instrument is a right-of-first-refusal instrument, the system 1 goes to FIG. 3D and computes 152 the demand at the current preferred return from right-of-first-refusal buyers. Then system 1 determines 154 whether the demand from right-of-first-refusal buyers equals the supply at the current preferred return. If yes, the system 1 outputs confirmations of buy and sell transactions by going to step 128. If the demand from right-of-first-refusal buyers does not equal supply at the current preferred return, the system 1 determines 162 whether or not demand from right-of-first-refusal buyers exceeds supply. If yes, the system 1 computes 163 the excess demand and allocates 164 available supply to the right-of-first-refusal buyers according to the priorities programmed into the system 1. For example, buy orders from the issuer may be filled first and the remaining orders based on time of entry. After the available supply is allocated to buyers, the system 1 outputs confirmations of buy and sell transactions by going to step 128.

If no in step 162, i.e., if the demand from right-of-first-refusal buyers neither equals nor exceeds supply at the current preferred return, the system 1 goes to FIG. 3E and computes 172 the excess of supply over demand from right-of-first-refusal buyers at the current preferred return. Then system 1 then computes 174 the demand from non-right-of-first-refusal buyers and notifies 176 all potential right-of-first-refusal buyers of the amount of the available excess supply at the current preferred return, the amount of demand from non-right-of-first-refusal buyers and of their timetable for response.

At the end of the response period, the system 1 computes 178 the new buy orders from right-of-first-refusal buyers at the current preferred return. The system then determines 180 whether the new right-of-first-refusal orders equal the available excess supply at the current preferred return.

If yes, the system 1 outputs confirmations of buy and sell transactions by going to step 128. If no, the system 1 then goes to FIG. 3F to determine 188 whether or not the new right-of-first-refusal orders exceed the excess supply at the current preferred return.

If yes, the system 1 allocates 190 the available excess supply to the new right-of-first-refusal buy orders according to the priorities programmed into the system 1. For example, new buy orders from the issuer may be filled before new buy orders from right-of-first-refusal investors. After the available excess supply is allocated to the new right-of-first-refusal buy orders, the system 1 outputs confirmations of buy and sell transactions by going to step 128.

If no in 188, the new right-of-first-refusal orders neither equal nor exceed the excess supply at the current preferred return, the system 1 then fills 198 all right-of-first-refusal orders. Then the system 1 computes 200 the remaining excess supply after all right-of-first-refusal orders have been filled. The system 1 then determines 202 whether the non-right-of-first-refusal orders equal the remaining excess supply. If yes at 202, the system 1 outputs confirmations of buy and sell transactions by going to step 128. If no at 202, the system 1 then determines 210 if non-right-of-first-refusal orders exceed the remaining excess supply.

If yes at 210, the system 1 allocates 212 the remaining excess supply to the non-right-of-first-refusal orders according to the priorities programmed into the system 1. After allocating the remaining excess supply, the system 1 outputs confirmations of buy and sell transactions by going to step 128. If no at 210, i.e., the non-right-of-first-refusal orders neither equal nor exceed the remaining excess supply, the system 1 allocates 220 the non-right-of-first-refusal orders to the remaining sell orders according to the priorities programmed into the system 1. After allocating the non-right-of-first-refusal orders to the remaining excess supply, the system 1 outputs confirmations of buy and sell transactions by going to step 128.

The capability of handling risk class orders in the manner of the present invention increases the ability of both small issuers and smaller investors to directly participate in the automated auction market. Trading by risk class significantly increases effective liquidity of small securities issues by allowing large numbers of small issues to trade as if the separate issues were one large issue. The increase in liquidity lowers the risk for investors, thus lowering the required preferred return on the small issues and making it economical for smaller businesses to sell their securities in the automated market.

Further, trading by risk classes enables small investors to easily and economically trade small holdings in numerous securities, thus enabling even small investors to economically achieve the safety of wide diversification of their holdings. The ability of small investors to economically achieve diversification is vital for their direct participation in the market because it is generally not prudent for them to concentrate their investments in a small number of securities.

The market also benefits from the direct participation of large numbers of investors. The direct participation of large numbers of investors means that trading in the market is dominated by long-term, price-stabilizing trading rather than by short-term, price-destabilizing trading. This reduction in price volatility will attract still greater direct participation by investors, thus creating a virtuous cycle.

This virtuous cycle can be further enhanced by the use of the Constant-Currency invention to eliminate all of the inflation risk and most of the interest rate risk, thus eliminating or greatly reducing the two largest sources of price volatility in preferred-return investments. The automated liability management invention will further reduce price volatility by stabilizing the risk classification of securities, thus greatly reducing the final significant source of price volatility in preferred-return securities—changes in default risk.

In addition to facilitating the direct participation of the majority of funds users, the automated market system of the present invention facilitates real-time distribution of information (e.g., digital communication by modems, etc.) to and from the computer systems utilized by funds users, funds providers, financial intermediaries, financial information service providers, rating services, as well as advisors and consultants to the foregoing.

Moreover, the automated market system of the present invention facilitates implementation of important data standards. Not the least of these is establishing an interest rate standard for measuring the current preferred return. (Presently, there are many different interest rates used in the market place, each of which would result in a different number when calculating the current preferred return of the same instrument purchased at the same price.)

In order to facilitate accurate comparison of the current preferred return of one instrument relative to another, a preferred embodiment of the present invention incorporates an interest rate standard. An attractive standard for the present invention is the Effective Annual Rate (EAR) defined in US federal law as the official standard for disclosure to consumers of the true cost of credit (i.e., the true current preferred return on the preferred return instrument that the consumer is considering issuing in order to obtain the use of funds.)

A second data standard is the assignment of credit risk to the instruments. At present the assignment of certain credit risk ratings is done by a few large credit rating firms (e.g., S&P, Moodys, Fitch), which use respective proprietary methodologies. As a result, both funds users and funds providers have limited information about factors used to determine ratings or which trigger changes in ratings. They also have limited information regarding the relationship between rating criteria and historical credit performance.

A preferred embodiment of the present invention incorporates an open standard that is used to determine the credit risk of each instrument. The rating program is tied on a real-time basis to the database for issuers and their securities. Therefore, ratings will be continually updated using the latest available information. Additionally, the ratings are continuously evaluated against historical credit performance. This continuous evaluation provides a feedback mechanism (loop) to continuously improve the quality of the ratings criteria. All this information, including the historical credit performance of the criteria and the feedback process will be open to the funds users and funds providers to improve predictability and knowledgeable decision-making.

While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

We claim:

1. A method for using a digital electrical machine to electrically process signals in generating output, the method including the steps of:

providing a first digital electrical computer apparatus including a digital computer having a processor, the processor electrically connected to a memory device for storing and retrieving machine-readable signals, to an input device for receiving input data and converting the input data into input electrical data, and to an output device for converting output electrical data from the processor into output having a visual presentation, the processor being programmed to control the apparatus to receive the input data and to produce the output data:

respectively entering financial characteristics sufficient for computing a price for preferred-return instruments representing investments;

respectively entering amounts that buyers want to buy of a member from a first group, the first group consisting of at least one of the instruments and at least one group of the instruments, at the respective buyer's hypothetical current preferred return;

respectively entering amounts that sellers want to sell of a member of a second group, the second group consisting of at least one of the instruments and at least one group of the instruments, at the respective seller's hypothetical current preferred return;

computing a demand schedule for each of said instruments corresponding to the first group;

computing a supply schedule for each of said instruments corresponding to the second group;

comparing the schedules to produce a current preferred return for each of the corresponding instruments in both the first group and the second group;

computing a price for each said instrument having a current preferred return; and generating the output including respective amounts of the instruments respectively in association with at least one member of a group consisting of the current preferred return and the price.

2. The method of claim 1, further including the steps of:
respectively entering seller's information including holdings prior to a sale of the investment; and
generating further output representing respective sellers' holdings seller adjusted for the sale of the investment.

3. The method of claim 1, wherein the step of entering financial characteristics includes entering a preferred return for the instrument as one of the financial characteristics.

4. The method of claim 1, wherein the step of entering financial characteristics includes entering a face value for the instrument as one of the financial characteristics.

5. The method of claim 1, wherein the step of entering financial characteristics includes entering a payment schedule for the instrument as one of the financial characteristics.

6. The method of claim 1, wherein the step of entering financial characteristics includes entering an amortization schedule return for the instrument as one of the financial characteristics.

7. The method of claim 1, wherein further including the steps of:
computing any imbalance between each said supply schedule and each said demand schedule at the current preferred return for the investment; and
allocating the respective imbalances among the buyers for each excess in each said demand schedule and allocating the respective imbalances among the sellers for each excess in each said supply schedule.

8. The method of claim 7, wherein the step of entering amounts that the sellers want to sell includes entering information identifying some of the sellers as issuers of respective ones of the instruments; and wherein the step of allocating includes giving priority to the ones of the instruments.

9. The method of claim 1, wherein the step of entering the financial characteristics includes entering a right of first refusal.

10. The method of claim 1, wherein at least one of the step of entering the amounts that the buyers want to buy and the step of entering the amounts that the sellers want to sell includes optionally entering respective standing orders.

11. The method of claim 1, wherein at least one of the step of entering the amounts that the buyers want to buy and the step of entering the amounts that the sellers want to sell includes optionally entering a respective time associated with the amounts for a sale to be completed.

12. The method of claim 1, wherein the steps of comparing the schedules, computing a price, and generating output are carried out whenever a criteria from a group consisting of at least a time period and an order quantity is satisfied.

13. The method of any one of claim 2, wherein the steps of comparing the schedules, computing a price, and generating output are triggered by the step of entering amounts that buyers want to by and the step of entering amounts that sellers want to sell.

14. The method of any one of claims 1-13, wherein:
the step of entering financial characteristics includes entering a risk class for the respective instruments; and wherein:
the step of entering the amounts that the buyers want to buy includes entering amounts that buyers want to buy of a member from a first group, the first group consisting of at least one of the instruments and at least one group of the instruments defined by a common risk class; and
the step of entering the amounts that the sellers want to sell includes entering amounts that sellers want to sell of a member from a second group, the second group consisting of at least one of the instruments and at least one group of the instruments defined by a common risk class.

15. The method of claim 1, further including:
providing a second digital electrical computer apparatus including a second digital computer having a second processor, the second processor electrically connected to a second memory device for storing and retrieving second machine-readable signals, to a second input device for receiving second input data and converting the second input data into second input electrical data, and to a second output device for converting second output electrical data into second output having a second visual presentation and programming the second processor to control the apparatus to receive the second input data and to produce the second output data by steps including:
using data obtained from the first digital electrical computer in remotely generating, at said second digital electrical computer apparatus, output representing respective amounts of preferred return instruments respectively in association with at least one member of a group consisting of the current preferred return and the price.

16. A method for making a digital electrical machine to electrically process signals in generating preferred-return documentation, the method including the steps of:
providing a first digital electrical computer apparatus including a digital computer having a processor, the processor electrically connected to a memory device for storing and retrieving machine-readable signals, to an input device for receiving input data and converting the input data into input electrical data, and to an output device for converting output electrical data from the processor into output having a visual presentation; and
programming the processor to form circuitry therein to control the apparatus to receive the input data and to produce the output data by steps including:
receiving respectively entered financial characteristics sufficient to compute a price for preferred-return instruments representing investments;
receiving respectively entered amounts that buyers want to buy of a member from a first group, the first group consisting of at least one of the instruments and at least one group of the instruments, at the respective buyer's hypothetical current preferred return;

receiving respectively entered amounts that sellers want to sell of a member of a second group, the second group consisting of at least one of the instruments and at least one group of the instruments, at the respective seller's hypothetical current preferred return;

computing a demand schedule for each of said instruments corresponding to the first group;

computing a supply schedule for each of said instruments corresponding to the second group;

comparing the schedules to produce a current preferred return for each of the corresponding instruments in both the first group and the second group;

computing a price for each said instrument having a current preferred return; and generating the output including respective amounts of the instruments respectively in association with at least one member of a group consisting of the current preferred return and the price.

17. A digital electrical machine to electrically process signals in generating preferred-return documentation, the machine including:

a first digital electrical computer apparatus including a digital computer having a processor, the processor electrically connected to a memory device for storing and retrieving machine-readable signals, to an input device for receiving input data and converting the input data into input electrical data, and to an output device for converting output electrical data from the processor into output having a visual presentation; and wherein the processor is a programmed to form circuitry therein to control the apparatus to receive the input data and to produce the output data by steps including:

receiving respectively entered financial characteristics sufficient to compute a price for preferred-return instruments representing investments;

receiving respectively entered amounts that buyers want to buy of a member from a first group, the first group consisting of at least one of the instruments and at least one group of the instruments, at the respective buyer's hypothetical current preferred return;

receiving respectively entered amounts that sellers want to sell of a member of a second group, the second group consisting of at least one of the instruments and at least one group of the instruments, at the respective seller's hypothetical current preferred return;

computing a demand schedule for each of said instruments corresponding to the first group;

computing a supply schedule for each of said instruments corresponding to the second group;

comparing the schedules to produce a current preferred return for each of the corresponding instruments in both the first group and the second group;

computing a price for each said instrument having a current preferred return; and generating the output including respective amounts of the instruments respectively in association with at least one member of a group consisting of the current preferred return and the price.

* * * * *